(12) United States Patent
Vaders

(10) Patent No.: US 6,524,504 B2
(45) Date of Patent: Feb. 25, 2003

(54) METHOD OF PRODUCING CELLULOSIC ARTICLE HAVING INCREASED THICKNESS, AND PRODUCT THEREOF

(75) Inventor: Dennis H. Vaders, Elkin, NC (US)

(73) Assignee: Masonite Corporation, Tampa, FL (US)

( * ) Notice: Subject to any disclaimer, the term of this patent is extended or adjusted under 35 U.S.C. 154(b) by 116 days.

(21) Appl. No.: 09/754,641

(22) Filed: Jan. 4, 2001

(65) Prior Publication Data

US 2002/0127392 A1 Sep. 12, 2002

(51) Int. Cl.⁷ ............................ B27N 3/10; B27N 3/22
(52) U.S. Cl. ............................ 264/113; 264/112
(58) Field of Search ................................ 264/112, 113

(56) References Cited

U.S. PATENT DOCUMENTS

| | | | |
|---|---|---|---|
| 3,804,702 A | 4/1974 | Smith et al. | |
| 4,024,304 A | 5/1977 | Smock et al. | |
| 4,111,744 A | 9/1978 | Reiniger | |
| 4,158,070 A | 6/1979 | Lewicki, Jr. et al. | |
| 4,175,148 A | 11/1979 | Luck et al. | |
| 4,175,150 A | 11/1979 | Luck et al. | |
| 4,203,255 A | 5/1980 | Naslund et al. | |
| 4,259,112 A | 3/1981 | Dolowy, Jr. et al. | |
| 4,305,989 A | 12/1981 | Luck et al. | |
| 4,327,142 A | 4/1982 | Norzi | |
| 4,350,545 A | 9/1982 | Garabedian | |
| 4,379,808 A | * 4/1983 | Cole et al. | 156/196 |
| 4,517,147 A | 5/1985 | Taylor et al. | |
| 4,557,778 A | 12/1985 | Held | |
| 4,853,170 A | 8/1989 | Bühler et al. | |
| 4,877,656 A | 10/1989 | Baskin | |
| 4,911,788 A | 3/1990 | Pittman et al. | |
| 4,935,082 A | 6/1990 | Bennett et al. | |
| 4,992,227 A | * 2/1991 | Brossy | 156/62.2 |
| 5,093,051 A | 3/1992 | Reiniger | |
| 5,154,874 A | 10/1992 | Koslowski | |
| 5,543,234 A | 8/1996 | Lynch et al. | |
| 5,629,083 A | 5/1997 | Teodorczyk | |

* cited by examiner

*Primary Examiner*—Mary Lynn Theisen
(74) *Attorney, Agent, or Firm*—Liniak, Berenato & White, LLC

(57) ABSTRACT

A method of preparing a cellulosic article includes a step of combining cellulosic material and binder resin to form treated cellulosic material. A mat is formed of a plurality of layers of the treated cellulosic material. The method also includes the steps of interfering with bonding of resin between two adjacent layers of the mat, and applying heat and pressure to the mat to form a cellulosic composite article having an internal blistered pattern. A consolidated cellulosic article includes a consolidated cellulosic mat and a layer of blisters disposed in the consolidated cellulosic mat.

14 Claims, 1 Drawing Sheet

METHOD OF PRODUCING CELLULOSIC ARTICLE HAVING INCREASED THICKNESS, AND PRODUCT THEREOF

BACKGROUND OF THE INVENTION

1. Field of the Invention

The invention relates generally to the production of consolidated cellulosic articles. More particularly, the invention relates to the production of a consolidated cellulosic article having increased thickness.

2. Brief Description of Related Technology

Man-made consolidated cellulosic materials, such as fiberboard, can be embossed or molded to have three-dimensional shapes and various design and structural features found in natural wood. Types of useful consolidated cellulosic materials are referred to by the following terms, for example: (a) fiberboards such as hardboard (e.g., low-density hardboard), soft board, and medium-density fiberboard ("MDF") and (b) chipboards such as particleboard, medium-density particleboard, and oriented strandboard ("OSB"). Composites of these boards are also useful.

Various processes can be used to produce consolidated cellulosic materials, such as those mentioned above. The principal processes for the manufacture of consolidated cellulosic articles include the following: (a) wet felted/wet pressed or "wet" processes, (b) dry felted/dry pressed or "dry" processes, and (c) wet felted/dry pressed or "wet-dry" processes.

Generally in a wet process, cellulosic materials such as fibers (e.g., woody material which is subjected to fiberization to form wood fibers) are blended in a vessel with large amounts of water to form a slurry. The slurry preferably has sufficient water content to suspend a majority of the wood fibers and preferably has a water content of at least ninety percent by weight ("weight percent") of the wood fibers. The slurry is deposited along with a synthetic resin binder, such as a phenol-formaldehyde resin, onto a water-pervious support member, such as a fine screen or a Fourdrinier wire, where much of the water is removed to leave a wet mat of cellulosic material having, for example, a moisture content of about fifty weight percent, based on the dry weight of the fibers. The wet mat is transferred from the pervious support member to a press and consolidated under heat and pressure to form the molded wood composite.

A wet-dry forming process can also be used to produce cellulosic composites. Preferably, a wet-dry process begins by blending cellulosic or wood fiber raw material in a vessel with large amounts of water having a pH of less than seven to form a slurry. This slurry is then blended with the resin binder. As in the wet process described above, the blend is then deposited onto a water-pervious support member, where a large percentage of the water is removed, thereby leaving a wet mat of cellulosic material having a water content of about fifty weight percent, for example. This wet mat is then transferred to an evaporation zone where much of the remaining water is removed by evaporation. The dried mat preferably has a moisture content of less than about thirty weight percent. The dried mat is then transferred to a press and consolidated under heat and pressure to form the wood composite which may be, for example, a flat board, a doorskin, or any other desired shape depending on the intended use of the product.

In a dry process, the cellulosic material is generally conveyed in a gaseous stream or by mechanical means rather than a liquid stream. The cellulosic material may be first coated with a thermosetting resin binder, such as a phenol-formaldehyde resin. The cellulosic material is then randomly formed into a mat by air blowing one or more layers of the resin-coated cellulosic material onto a support member. The mat may optionally be subjected to pre-press drying. The mat, typically having a moisture content of less than about thirty weight percent and preferably less than about ten weight percent, is then pressed under heat and pressure to cure the thermosetting resin and to compress the mat into an integral consolidated structure.

During the step of consolidating a cellulosic mat under heat and pressure, a large volume of steam and other gases is typically produced, due to heating of the moisture content of the mat and production of gas during curing of the binder resin, as described for example in Lynch et al., U.S. Pat. No. 5,543,234, the disclosure of which is incorporated herein by reference, and in Reiniger, U.S. Pat. No. 5,093,051. At the completion of the pressing step, opening the press molds typically causes a rapid reduction in pressure in the mold cavity, which sometimes results in the sudden release of water vapor and gases trapped beneath the upper surface of the molded article. This release of gas sometimes causes a portion of the article to "bubble" or "blister" as a portion of the molded surface delaminates from the remaining portion of the article due to the sudden escape of gas from an interior portion of the molded article.

As described in Lynch et al. and Reiniger, for example, forming blisters in a consolidated cellulosic article is considered undesirable, and various techniques are used to avoid blistering. In some mold designs, for example, venting of steam and other gases is accomplished by disposing a gas-pervious material between a back half of the mold cavity and a non-visible side of the product being molded, which allows controlled gas venting without the formation of blisters in the molded article. Other methods of avoiding blistering in consolidated cellulosic products include the use of a vented gas emission control plate, as disclosed in Reiniger.

The thickness, or caliper, of a consolidated cellulosic material is affected by factors such as the amount of material in the cellulosic mat, the temperature and pressure at which the mat is consolidated, and the design of the mold cavity. The desired caliper depends upon the application for which the consolidated cellulosic material is expected to be used. Increasing the caliper of a consolidated cellulosic article may be accomplished by increasing the amount of cellulosic material in the mat, or by laminating two or more consolidated boards together. Both of these methods have the disadvantage of increasing the cost of producing the consolidated cellulosic article, due to the need for increased labor and/or materials to produce the product. Consequently, there is a need for an improved method for producing a consolidated cellulosic article having an increased caliper.

SUMMARY OF THE INVENTION

According to one aspect of the present invention, a method of preparing a cellulosic article includes a step of combining cellulosic material and binder resin to form treated cellulosic material. A mat is formed of a plurality of layers of the treated cellulosic material. The method also includes interfering with bonding of resin between two adjacent layers of the mat, and applying heat and pressure to the mat to form a cellulosic composite article having an internal blistered pattern.

According to another aspect of the present invention, a consolidated cellulosic article includes a consolidated cellulosic mat and a layer of blisters disposed in the consolidated cellulosic mat.

Further aspects and advantages of the invention will be apparent to those skilled in the art from the following detailed description, taken in conjunction with the appended claims.

DETAILED DESCRIPTION OF THE INVENTION

Figure 1:
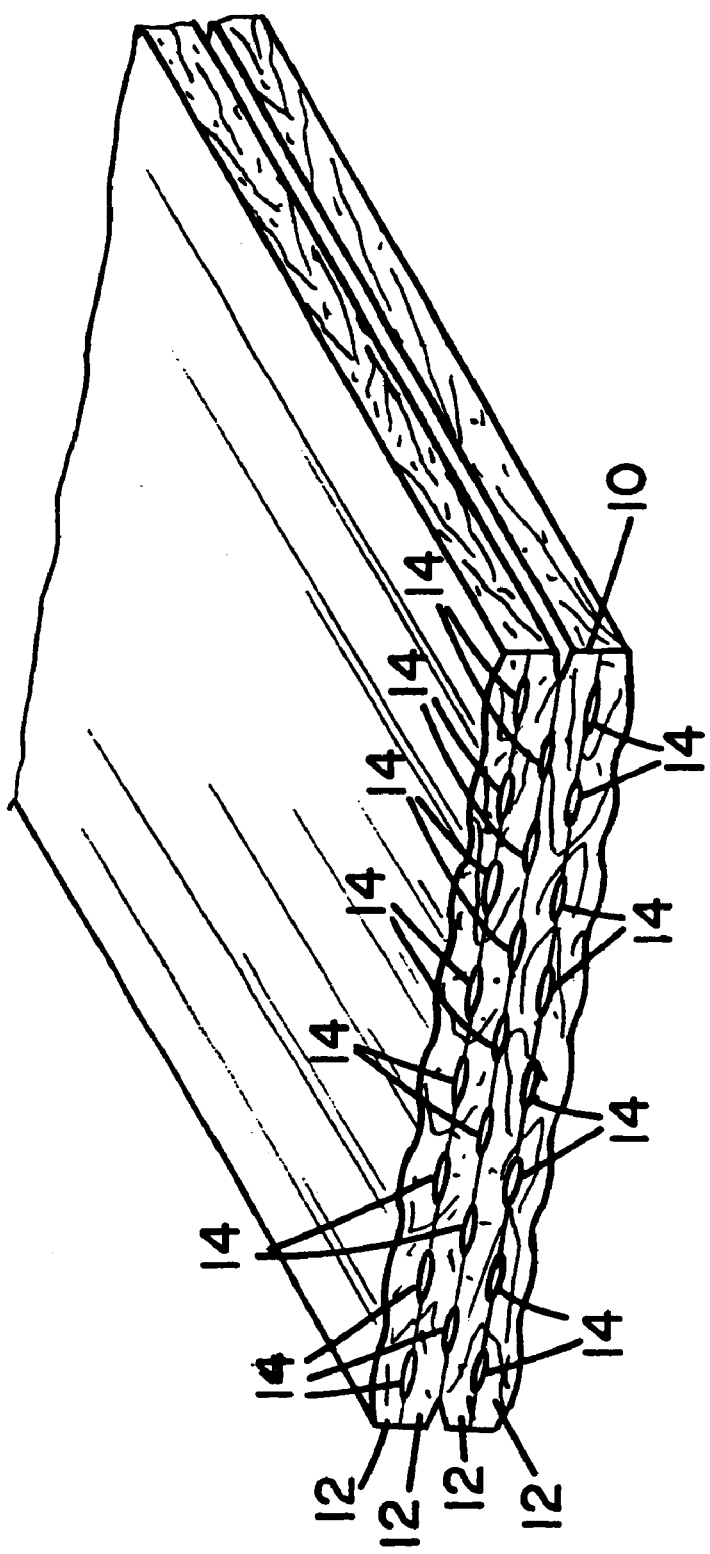
FIG. 1 is a cross-sectional view of a consolidated cellulosic article of the present invention.

The embodiments described herein are not intended to limit the scope of the invention to the precise forms disclosed. The embodiments have been chosen and described in order to explain the principles of the invention and its practical use in order to enable others skilled in the art to follow their teachings.

Referring to FIG. 1, a consolidated cellulosic article 10 having an internal blistered pattern is shown. The article 10 may be, for example, a fiberboard product (e.g., hardboard or medium density fiberboard (MDF)) or a chipboard product (e.g., particleboard, medium-density particleboard, or oriented strand board (OSB)). The article 10 includes two or more layers 12. Between adjacent layers 12 is a pattern of blisters 14.

To prepare a consolidated cellulosic article 10 having an internal blistered pattern, a mat is formed by combining cellulosic material (e.g., wood fibers or wood chips) with a binder resin to form treated cellulosic material. The treated cellulosic material is then formed into a mat comprising a plurality of layers of treated cellulosic material, according to methods known to those skilled in the art. A "dry" production process is preferred for the invention, but wet or wet/dry processes can also be used.

By interfering with or obstructing bonding between a pair of adjacent layers in the mat, a consolidated cellulosic article 10 having an internal blistered pattern can be produced. The step of interfering with bonding may be effected in a variety of ways. For example, a barrier layer can be placed between two adjacent layers of the mat. Suitable barrier layers can include materials such as powders, e.g., stearate powder or talcum powder; wood dust or other inexpensive, powdery materials that will not bind under heat and pressure; a thermoplastic material, such as polyethylene or polyester (e.g., DuPont's MYLAR brand polyester film); or a paper strip or patch comprising a release agent, such as water, silicone, talc, sand, dirt, or clay. Suitable papers for holding a release agent include any low-cost, thin papers, such as brown craft paper. The barrier layer can have a thickness up to about 1/16" (about 0.16 cm). Preferably, the barrier layer has a thickness of less than about 0.010" (about 0.025 cm). The barrier layer preferably extends over part, but not all, of the area between adjacent layers of the mat.

In another embodiment, during the mat-forming process, bonding can be interfered with by applying heat to one of the mat layers, which pre-cures the resin at the surface of the mat layer, or may char the surface, which destroys both the resin and cellulosic material at the surface.

The consolidated cellulosic article 10 is then formed by consolidating the mat in a press, under heat and pressure, according to methods known to those skilled in the art. For example, a wood fiber mat can be pressed into a fiberboard product under the following conditions:

| | |
|---|---|
| mat thickness: | 3" to 12" (7.6 cm to 30 cm) |
| thickness of mat layers | 0.032" to 0.125" (0.081 cm to 0.318 cm) |
| board thickness: | 1/8" to 1¼" (0.318 cm to 3.18 cm) |
| pressure: | 300 psi to 1000 psi (21 kg/cm² to 70 kg/cm²) |
| pressing time: | 45 sec. to 1 min. 15 sec. |
| board specific gravity: | 0.6 to 1.0 |
| pressing temperature | 300° F. to 500° F. (149° C. to 260° C.) |

By adjusting pressing conditions to control the production and release of steam and other gases produced during the consolidation step, the release of steam and gases can be used to form a pattern of cavities or blisters 14 in the article 10, the blisters 14 being formed between the layers that have been treated to interfere with bonding. To encourage the formation of steam and blisters 14, the pressing time and press-opening speed may need to be adjusted from typical conditions. If the board is heated for too long of a time period, there may not be enough steam remaining in the press to form blisters upon opening the press. However, if the press time is too short, the bond between layers of the mat may not be sufficiently strong. Press temperatures need to be high enough to create steam from moisture in the mat. A press time of about 30 seconds to about 20 minutes, at a temperature of about 250° F. to about 600° F. (about 121° C. to about 316° C.), is expected to be effective for promoting blistering. A fast press opening speed is also desirable for promoting blistering. Typically, in conventional pressing, the press is opened slowly, over a time period of about 5 seconds to about 10 seconds, to avoid forming blisters. Moreover, in conventional pressing a "degassing" step may be performed to relieve pressure in the press without forming blisters. In a typical degassing step, the force on the press molds is reduced and the press molds are allowed to separate a slight distance, up to about 0.001" (about 0.025 mm). The press is then held in position for approximately 2 seconds to allow pressure in the press to be relieved, after which the press can be opened.

According to the present invention, the press is preferably opened quickly, which encourages the release of steam and formation of blisters. A press opening time of less than about 5 seconds, more preferably less than about 2 seconds, is expected to be effective in promoting the formation of blisters. The press may be opened in a number of stages, wherein the press is partially opened during each stage. If the press is opened in stages, the press-opening times specified herein refer to times for the first stage of opening the press. After the first press-opening stage the pressure in the press is relieved, and the press may thereafter be opened more slowly, without having an effect on blister formation. In one embodiment, the press can be opened rapidly in a first stage to an opening of up to about ¼" (about 0.635 cm), more preferably to an opening of up to about ⅛" (about 0.318 cm), still more preferably to an opening of up to about 1/16" (about 0.159 cm), and held in position for a short time, preferably at least 2 seconds, to allow pressure to dissipate and to allow blisters to form. After the pressure has been dissipated and blisters have formed, the press can be opened further as needed.

The resulting consolidated cellulosic article or product 10 will include a pattern of blisters 14 between the layers for which bonding was interfered with. For mats including three or more layers, articles can be produced having a plurality of layers of blisters. Contrary to prior-art teachings to avoid blistering, the controlled formation of blisters in a consolidated cellulosic article results in a product having a number of advantages. The product 10 has increased thickness compared to products without a layer of blisters. For example, boards having their thickness increased by 50% compared to conventional boards can be produced (i.e., the blistered article 10 can have a thickness of up to at least about 1⅞" (about 4.76 cm)). The product 10 has a lower specific gravity, compared to conventional boards (i.e., the article 10 can have a specific gravity between about 0.3 and about 0.8, more preferably between about 0.4 and about 0.6), and requires less raw material compared to a conventional board of similar thickness. (Conventional boards typically have a thickness of about ⅛" to about 1¼" (about 0.318 cm to about 3.18 cm) and a specific gravity of about 0.6 to about 1.2.) The product 10 may have reduced compressive strength perpendicular to its surface, allowing greater compressibility compared to conventional boards, which may be useful for allowing shock absorption for applications such as pallet decks or crate bottoms. The blistering also provides hollow spaces in the product 10, which may be useful for routing wires or cables or inserting other materials. The surface of the product 10 may have a texture that requires sanding if a flat surface is required. However, the product 10 may be used as a core for a finished product with a flat surface, such as a three-layer-panel having conventional flat panels adhesively connected to the surface of the product 10.

The foregoing description is given for clearness of understanding only, and no unnecessary limitations should be understood therefrom, as modifications within the scope of the invention will be apparent to those skilled in the art.

What is claimed is:

1. A method of preparing a cellulosic composite article comprising the steps of:

combining cellulosic material and binder resin to form treated cellulosic material;

forming a mat comprising a plurality of layers of the treated cellulosic material;

interfering with bonding of resin between two adjacent layers of the mat; and applying heat and pressure to the mat to form a cellulosic composite article having an internal blistered pattern.

2. The method of claim 1 wherein the step of interfering with bonding of resin comprises the step of placing a barrier layer between two adjacent layers of the mat.

3. The method of claim 2 wherein the barrier layer has a thickness of less than about 1/16" (about 0.16 cm).

4. The method of claim 3 wherein the barrier layer has a thickness of less than about 0.010" (about 0.025 cm).

5. The method of claim 2 wherein the barrier layer comprises stearate powder.

6. The method of claim 2 wherein the barrier layer comprises talcum powder.

7. The method of claim 2 wherein the barrier layer comprises wood dust.

8. The method of claim 2 wherein the barrier layer comprises a thermoplastic material.

9. The method of claim 1 wherein the mat comprises four layers.

10. The method of claim 1 wherein the step of interfering with bonding of resin comprises the step of applying heat to a mat layer to pre-cure some of the resin in the layer.

11. The method of claim 1 wherein heat and pressure are applied to the mat for about 30 seconds to about 20 minutes.

12. The method of claim 1 wherein the mat is heated to a temperature of about 250° F. to about 600° F. (about 121° C. to about 316° C.).

13. The method of claim 1 wherein the cellulosic composite article is formed in a press, which is opened in a time period of less than about 5 seconds.

14. The method of claim 13 wherein the press is opened in a time period of less than about 2 seconds.

* * * * *